United States Patent
Hohner et al.

(10) Patent No.: US 9,284,431 B2
(45) Date of Patent: Mar. 15, 2016

(54) METHOD FOR RECYCLING FLOOR COVERINGS

(75) Inventors: Gerd Hohner, Augsburg (DE); Christian Steib, Cologne (DE); Timo Herrlich, Affing (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 14/377,131

(22) PCT Filed: Jan. 24, 2012

(86) PCT No.: PCT/EP2012/000319
§ 371 (c)(1),
(2), (4) Date: Aug. 6, 2014

(87) PCT Pub. No.: WO2012/100940
PCT Pub. Date: Aug. 2, 2012

(65) Prior Publication Data
US 2015/0005401 A1    Jan. 1, 2015

(30) Foreign Application Priority Data
Feb. 14, 2012 (DE) .......... 10 2012 002 704

(51) Int. Cl.
*B01J 49/00* (2006.01)
*C08J 11/08* (2006.01)
*C08J 5/20* (2006.01)

(52) U.S. Cl.
CPC .............. *C08J 11/08* (2013.01); *C08J 2323/02* (2013.01); *C08J 2323/06* (2013.01); *C08J 2391/06* (2013.01); *C08J 2423/02* (2013.01); *C08J 2423/12* (2013.01); *Y02W 30/701* (2013.01)

(58) Field of Classification Search
CPC ..... C08J 11/08; C08J 2323/06; C08J 2423/12
USPC ....................................................... 521/47
See application file for complete search history.

(56) References Cited

U.S. PATENT DOCUMENTS

| 3,755,484 | A | | 8/1973 | Langer, Jr. | |
| 5,198,471 | A | | 3/1993 | Nauman et al. | |
| 5,396,333 | A | * | 3/1995 | Aleshin et al. | ........ 356/601 |
| 5,731,483 | A | | 3/1998 | Stabel et al. | |
| 8,138,232 | B2 | | 3/2012 | Maeurer et al. | |
| 2008/0113146 | A1 | * | 5/2008 | Wright et al. | |

FOREIGN PATENT DOCUMENTS

| DE | 4110136 | 10/1992 |
|---|---|---|
| DE | 102005026451 | 12/2006 |
| EP | 0491836 | 7/1992 |
| EP | 1438351 | 7/2004 |
| EP | 2236671 | 10/2010 |
| EP | 2236672 | 10/2010 |
| FR | 2111963 | 6/1972 |
| GB | 107383 | 6/1917 |
| WO | WO 95/03375 | 2/1995 |
| WO | WO 2008/064012 | 5/2008 |
| WO | WO 2011/082802 | 7/2011 |

OTHER PUBLICATIONS

International Search Report for PCT/EP2013/000319, mailed Jun. 5, 2013.
Ullmann's Encyclopedia of Industrial Chemistry, 6th edition, vol. A 21, "Plastics, Recycling", Weinheim 2005.
European Synthetic Turf Organisation (ESTO) Mar. 2009, position paper regarding "end-of-life" options.
E. Novak, Verwertungsmoglichkeiten fur ausgewahte Fraktionen aus der Demontage von Elektroaltgeraten, OFI Kunststoffinstitut, Vienna 2011, 12-14.
H. Martens, Recyclingtechnik, Spektrum Heidelberg 2011, 171ff, of "selective swelling".
Ullmann's Encyclopedia of Industrial Chemistry, 2000, Waxes.
Ullmann's Encyclopedia of Industrial Chemistry, 2006, Metallocenes.

* cited by examiner

*Primary Examiner* — Terressa Boykin
(74) *Attorney, Agent, or Firm* — Anthony A. Bisulca

(57) ABSTRACT

The invention relates to a solvent-based separation method for the total material recycling of materials used in nonwoven, woven, and tufted wares into the individual material components thereof sorted by type. At least one of the materials contains a polyolefin wax. As a solvent and/or swelling agent, halogen-free, aliphatic hydrocarbons or aromatic hydrocarbons or a mixture of one or several of said solvents are used.

20 Claims, 1 Drawing Sheet mass balance:
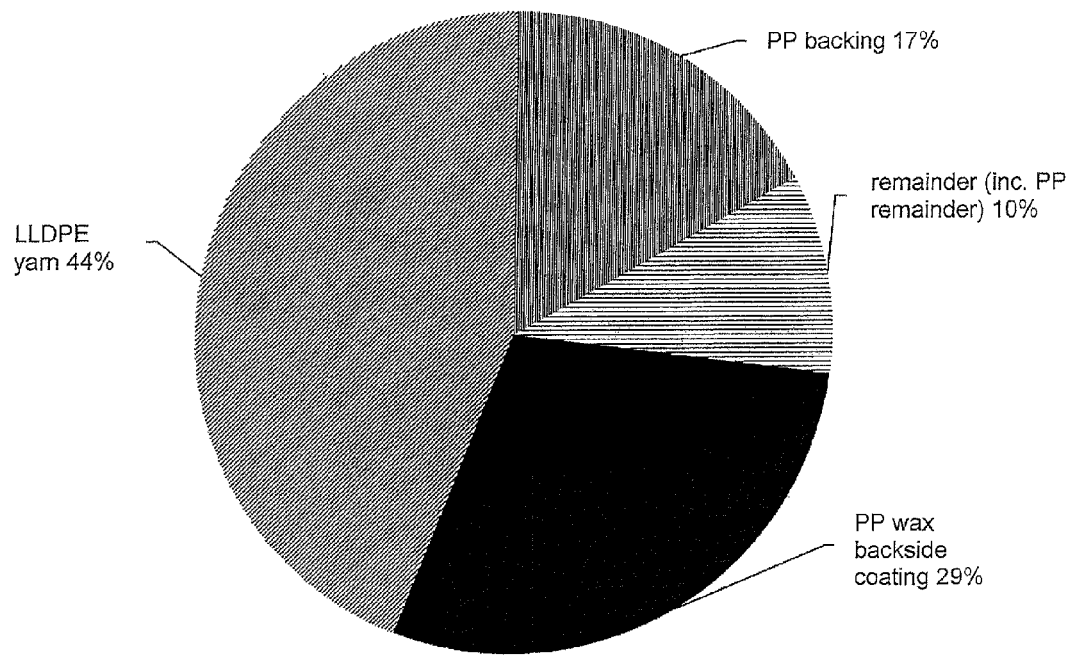

METHOD FOR RECYCLING FLOOR COVERINGS

The invention relates to a method of recycling floorcoverings of any kind to recover the feedstocks used. A solvent-borne method of recycling allows the various feedstocks used to be reclaimed in a varietally pure state at the end of the life cycle for floorcoverings or synthetic turf.

Carpets and synthetic turfs are floorcovering constructions consisting of a (primary) backing, a yarn, a backcoating and often a secondary backing such as, for example, a woven fabric, a nonwoven fabric, a foam or a heavy layer. Drawing 1 depicts a typical breakdown of the mass percentages. Various plastics are used for the different components. The yarn in carpets is predominantly polypropylene, polyamide or else polyester. Polyethylene and polypropylene are primarily used in synthetic turf. The primary backing is usually made of polypropylene and polyester. An additional coating is needed to retain the yarn in the backing. The coating technologies currently employed in commercial practice utilize aqueous latex and acrylates almost exclusively as coating material for carpets (tufted, woven and non-woven) and polyurethane as well as aqueous latex for synthetic turf. The use of latex and polyurethane as coating material leads to a non-reversible cure for the backcoating and hence to an end product that is not capable of full mechanical or feedstock recycling.

The various recycling options (composting, incinerating, mechanical recycling, feedstock recycling) for mixed plastics in particular have been described, inter alia in Ullmann's Encyclopedia of Industrial Chemistry, 6th edition, Vol. A 21, "Plastics, Recycling", Weinheim 2005. More particularly, the possible reuse of floorcovering constructions such as carpets and synthetic turfs for mechanical recycling, feedstock recycling and energy recovery has also already been described.

EP-A-2236671 and EP-A-2236672 each describe a particular mechanical recycling method wherein post-use synthetic turf is comminuted by repelletization as a polymer blend and the repelletizate is admixed with virgin plastics and used for producing infill. Infill comprises granules scattered loosely onto the actual synthetic turf to provide cushioning for example. Mechanical recycling procedures of this type, wherein the materials are not recovered in varietally pure state and thus cannot be used in their original form, are also referred to by those skilled in the art as "downcycling". An example besides the reuse as infill for synthetic turf is the use of carpet regrind as heavy layer for tiles or automotive carpets.

The recovery of energy from floorcoverings including synthetic turf by burning is better than landfilling, but because it is based on a single use it runs counter to the concept of a circular economy, where a material is ideally recycled repeatedly. Therefore, energy recovery is particularly an option for compositions of matter which cannot be separated any further and also for fractions of material which have aged particularly severely and can no longer be used. In fact, a March 2009 position paper from the European Synthetic Turf Organisation (ESTO) regarding "end-of-life" options for synthetic turf recommends burning as the environmentally friendliest option instead of landfilling. The incineration residues can subsequently be further used as fillers in the concrete and cement industry for example.

Besides mechanical and energy recycling there is additionally also the option of feedstock recycling, wherein the plastics are converted back into their starting materials—oil or gas—by hydrogenation, gasification, cracking and/or pyrolysis. The development of feedstock recycling processes was taken to a very advanced state in the 1990s. WO 95/03375 for example discloses a recycling process wherein waste plastic is scissioned into a liquid product which is subsequently converted into olefins such as, for example, ethylene or propylene. The process is particularly useful for very large volumes of polyolefin-rich plastics (PE, PP). The conversion efficiency of the process is particularly high at above 93%. The disadvantage is that particularly large volumes of varietally pure waste plastic have to be collected for the commercially viable use of a steam cracker and therefore only a central use is economically sensible. Moreover, mixed plastics must be regarded as not very useful for this process. And particularly the disadvantage of having to transport the waste plastic, to the steam cracker from afar is another reason why the process failed to become established in practice.

Material recovery or mechanical recycling is an alternative to energy recovery, feedstock recycling, downcycling and landfilling—provided the various plastics are obtained in a varietally pure state. Simple mechanical methods of separation do not achieve this satisfactorily in the case of carpets, synthetic turfs and nonwovens.

There is accordingly a need for an efficient, economical method for recycling post-use synthetic turf and carpet materials that is in keeping with the fundamental concept of a circular economy.

BRIEF DESCRIPTION OF THE DRAWING

FIG. 1 depicts a typical breakdown of the mass percentages.

It has now been found that separation via "selective dissolution" is a promising possibility here, in particular when a thermoplastic and hence organosolvent-soluble polyolefin wax was used for bonding the backing and not a conventional latex or polyurethane coating.

The separation of mixed plastics by "selective dissolution" is based on the differing solubility of various thermoplastic polymers, such as plastics and waxes for example, in organic solvents. Suitable choices for solvent type, pressure and temperature enable incremental production of pure solutions of polymer and the recovery of varietally pure plastics by evaporating off the solvent. The advantages of this method reside in the extremely high product quality attainable and in the possibility of being able to remove additives that often dramatically curtail the possible uses for repelletizates. Even polyolefin mixtures consisting of HDPE (high density polyethylene), LDPE (low density polyethylene) and PP (polypropylene) can be separated to produce polyolefin blends containing at least 95% of the principal component (E. Novak, Verwertungsmöglichkeiten für ausgewählte Fraktionen aus der Demontage von Elektroaltgeräten, OFI Kunststoffinstitut, Vienna 2001, 12-14.).

EP-A-0491836 describes a method for recycling mixed plastics by "selective dissolution". The recycling process described is based in each case on a selected solvent and its solvent power for different plastics at various temperatures. Precipitants or further solvents are eschewed in this method.

The Fraunhofer Institute for Process Technology has used "selective dissolution" as the basis for making various technical advances, in particular toward an economical form of process management through a distinct reduction in solvent requirements and hence increase in polymer loading. DE-A-102005026451 for example describes a method for separating ABS (acrylic-butadiene-styrene copolymer) from mixed plastics. The mechanical recycling of EPS (expanded polystyrene) is described in EP-A-1438351. In WO 2011082802 the further development of "selective dissolution" is explicitly restricted to "selective swelling" (Fraunhofer process)

and is thereby delimited from EP-A-0491836 and also from conventional solvent-exchange processes.

Having regard to the various recycling options (burning, feedstock recycling, downcycling) for a floorcovering construction (synthetic turf, tufted, woven and non-woven) with a view to substantially complete mechanical recycling wherein the different plastics used are returned into the manufacturing process in a varietally pure state in order that yarn, backing and backcoating may again be produced therefrom, a solventborne method of recycling is currently the only alternative. The above-described methods of recycling which are based on selective dissolution/swelling are explicit in describing the separation of mixed plastics and also the separation of different polyolefins (HDPE, LDPE and PP) and represent the prior art therefor. What has not been described to date, however, is the separation of chemically related polymeric materials of differing molecular weight (e.g., HDPE from HDPE wax or polypropylene from polypropylene-based wax). Accordingly, the separation of polymer waxes and comparatively high molecular weight homo- and copolymers each based on propylene, ethylene or higher α-olefins ($C_4$-$C_{20}$) has also not been described before. Waxes of this type differ from the chemically related polymer in particular by their lower molecular weight and hence, by correlation therewith, their lower melt viscosity. Polyolefin waxes herein are delimited from polyolefin plastics by having a 170° C. melt viscosity below 40,000 mPa·s.

It has now been found that, surprisingly, floorcovering constructions having a backside coating based on polyolefinic homo- and copolymer waxes are particularly suitable for use in a solventborne method of recycling to recover the component materials therefrom in a varietally pure state. It was also found that the polyolefinic homo- and copolymer waxes are simpler and more thoroughly removable by virtue of their low dissolution temperatures compared with chemically related polymers of higher molar mass. It was additionally found that a varietally pure separation is particularly efficient when the polyolefinic homo- and copolymer waxes were manufactured using metallocene catalysts.

The present invention accordingly provides a solventborne method of separating the materials used in tufteds, wovens and non-wovens, especially in synthetic turfs and woven or other carpets, into their qualitatively varietally pure components for the purpose of recovering the materials, wherein at least one component material contains a polyolefin wax and wherein the solvent and/or swellant used comprises halogen-free aliphatic hydrocarbons and/or aromatic hydrocarbons.

The polyolefin wax concerned was preferably manufactured using metallocene catalysts.

The present solventborne method of separation relates to the recycling of floorcovering constructions such as tufteds, wovens and non-wovens, e.g., synthetic turfs and woven or other carpets, to recover some, preferably all, of the individual varietally pure component materials. The component materials are deemed to be varietally pure when crosscontamination with some other component material is not above 10 wt %, preferably not above 5 wt % and more preferably not above 1 wt %, and when the mechanical properties of the particular component material (e.g., tensile strength, elongation at break, modulus of elasticity, etc) are thereby not changed by more than 20%, preferably by not more than 10%, from the original properties of said component material prior to recycling.

The prerequisite for applying the solventborne method of separation to floorcovering constructions is that the component materials comprise at least one polymer that is soluble in a suitable organic solvent and also at least one soluble polyolefin wax and that not more than one insoluble component of the materials is present. The present invention further requires the dissolution temperatures to be sufficiently far apart from each other (by not less than 15 K) in order that "selective dissolution" or "selective swelling" may be ensured.

Solventborne methods of separation are known in the prior art, albeit not for the recycling of carpets or synthetic turfs. The principles of "selective dissolution" as in EP-A-0491836 or in H. Martens, Recyclingtechnik, Spektrum Heidelberg 2011, 171ff, of "selective swelling" as in WO 2011082802 and also "selective fractionation" are thus incorporated by reference.

The precise embodiments of solventborne methods of separation to recycle floorcovering constructions in the manner of the present invention must be adapted by a person skilled in the art to the particular floorcovering construction and the component materials used therein.

"Selective swelling" is technically particularly challenging, since polymer gels are obtained as a consequence of the low amount of solvent used, and not genuine solutions of polymers. The principle of separation rests on viscosity control via the degree of swelling, and aims to separate solid undissolved component materials from viscous polymer gels by filtration or sedimentation under suitable shearing.

Solvent evaporation and a subsequent drying operation at temperatures ranging from 30 to 120° C., wherein negative pressure is preferably employed in addition at the lower end of the temperature range, can be used to remove the solvent used and return it into the process. Any solvent residues still present at that stage can also be removed by extrusion with suitable devolatilization.

Useful solvents/swellants for the purposes of the present invention include halogen-free aliphatic hydrocarbons such as n-heptane or decalin, aromatic hydrocarbons such as toluene, xylene, tetralin, esters, ethers, heterocycles or mixtures of one or more thereof.

Applying a solventborne method of separation to floorcovering constructions in the manner of the present invention presupposes that at least one of the component materials, preferably that used for the backside bonding, consists of a polyolefin wax. The polyolefin waxes of the present invention comprise homopolymers based on ethylene or propylene and also copolymers based on polypropylene and 0.1 to 30 wt % of ethylene and/or 0.1 to 50 wt % of a branched or unbranched $C_4$-$C_{20}$ α-olefin. These polyolefin waxes can be manufactured in a known manner by polymerization, for example via an insertion mechanism, using Ziegler or metallocene catalysts or by a free-radical high-pressure process or by thermal degradation of plastics-type polyolefins. Appropriate manufacturing processes are described for instance in Ullmann's Encyclopedia of Industrial Chemistry, 2000, Waxes and also in Ullmann's Encyclopedia of Industrial Chemistry, 2006, Metallocenes. Amorphous polyalphaolefins (APAO) are similarly included for the purposes of the present invention. The preference of the present invention is for polyolefin waxes manufactured using metallocene catalysts. Surprisingly, such waxes could be separated off in a varietally purer state than, for example, waxes from the Ziegler process.

Preference is given to polyolefin waxes and also their recyclates with a number-average molar mass $M_n$ between 500 and 25,000 g/mol and a weight-average molar mass $M_w$ between 1000 and 40,000 g/mol and also to a polydispersity $M_w/M_n$ of below 5, preferably below 2.5, more preferably below 1.8. Molar mass is determined by gel permeation chromatography.

The polyolefin waxes preferably have a dropping or softening point (ring/ball) between 70° C. and 165° C. and a melt viscosity measured at 170° C. of not more than 40,000 mPa·s, preferably not more than 30,000 mPa·s, more preferably not more than 20,000 mPa·s.

Applying a solventborne method of separation to floorcovering constructions in the manner of the present invention determines that the varietally pure recyclates be used as component materials in their particular previous function in tufteds, wovens and non-wovens, for example synthetic turf.

The typical makeup of floorcovering constructions is depicted in drawing 1 for the example of a synthetic turf. Typical materials for the filaments may be natural fibers, for example wool, or manufactured fibers of LLDPE, LOPE, PP, polyester (e.g., PET (polyethylene terephthalate), PBT (polybutylene terephthalate)) or polyamide (e.g., nylon-6, nylon-6,6, nylon-6/10). Typical materials for the backing are, for example, polyethylene, polypropylene and polyester. The backside bonding in the present invention consists of a polyolefin wax.

Applying a solventborne method of separation to floorcovering constructions also encompasses the use of fillers such as, for example, calcium carbonate, or auxiliaries such as, for example, flame retardants, antistats, waxes, resins, plasticizers, pigments and antioxidants.

EXPERIMENTAL SECTION

The example hereinbelow shall further elucidate the invention without, however, restricting it to concretely disclosed embodiments. Percentages are by weight, unless otherwise stated.

Melting characteristics (melting point, enthalpy of melting) were determined using differential scanning calorimetry (DSC) to DIN 11357. Melt viscosities of waxes were determined to DIN 53019 using a rotary viscosmeter, dropping points to ASTM D3954 and the ringball softening points to ASTM D3104.

The molar mass weight average $M_w$ and the molar mass number average $M_n$ were determined by gel permeation chromatography at a temperature of 135° C. in 1,2-dichlorobenzene via calibration against an appropriate PP or PE standard.

Mechanical properties (tensile strength and elongation at break) were measured to DIN 527-1.

Example 1

Selective Dissolution as Exemplified with Synthetic Turf

The synthetic turf specimen used for this example consisted of an LLDPE (linear low density polyethylene) yarn, a backing of PP and also a backside coating based on a PP polyolefin wax manufactured using a metallocene catalyst and the original properties of which with regard to dropping point, molar mass, melt viscosity and mechanical properties are reported in the table below.

8 kg of waste synthetic turf from the sample described above were comminuted in a shredder and admixed with 40 kg of p-xylene, then the mixture was heated incrementally. The particular dissolution temperatures were 73° C. for the PP polyolefin wax, 96° C. for LLDPE and 146° C. for PP. Dissolution times were below 20 min in each case.

The PP polyolefin wax and the LLDPE were each extracted in 2 stages, while PP was separated off in a single stage. The component materials dissolved in the solvent were precipitated out by temperature reduction, squeezed off and dried at 40° C. under reduced pressure. The solvent thus recovered was fed back into the process.

The results are all shown in the following table:

TABLE

|  | PP wax (backside coating) | PP wax recyclate | LLDPE (yarn) | LLDPE recyclate | PP (backing) | PP recyclate |
|---|---|---|---|---|---|---|
| dropping point [° C.] | 97 | 97 | n.a. | n.a. | n.a. | n.a. |
| $T_m$ [° C.] | 88 | 89 | 125 | 123 | 163 | 160 |
| $\Delta H_m$ [mJ/mg] | −39 | −35 | −130 | −120 | −99 | −90 |
| $M_n$ | 17900* | 19400* |  |  |  |  |
| $M_w$ | 29700* | 30400* |  |  |  |  |
| PDI | 1.7 | 1.6 |  |  |  |  |
| tensile strength [MPa] | 9.9 | 9.6 | 8.9 | 7.9 | n.d. | n.d. |
| elongation at break [%] | 960 | 1010 | 12 | 13 | n.d. | n.d. |
| viscosity at 170° C. [mPa·s] | 5600 | 5200 | n.a. | n.a. | n.a. | n.a. | n.a. not applicable
n.d. not determined
*PP standard
** PE standard

What is claimed is:

1. A method of recovering individual varietally pure component materials used combined with each other in tufteds, wovens and nonwovens comprising the step of selective dissolution, selective swelling or both, wherein at least one of the component materials contains a polyolefin wax and the solvent and/or the swellant used comprises halogen-free aliphatic hydrocarbons aromatic hydrocarbons or both.

2. The method as claimed in claim 1 wherein the polyolefin wax comprises homo- or copolymers manufactured from ethylene, propylene, higher α-olefins of 4 to 20 carbon atoms or a combination thereof by polymerizing in the presence of metallocene catalysts and wherein the polyolefin wax has a dropping or softening point, ring/ball, between 70 and 160° C. and a melt viscosity, as measured at a temperature of 170° C., of not more than 40,000 mPa·s.

3. The method as claimed in claim 1, wherein the polyolefin wax has a weight-average molar mass $M_w$ between 1000 and 40,000 g/mol and a number-average molar mass $M_n$ between 500 and 25,000 g/mol.

4. The method as claimed in claim 1, wherein the polyolefin wax is a homopolymer based on ethylene or propylene or a copolymer consisting of propylene and 0.1 to 30 wt % of ethylene 0.1 to 50 wt % of at least one branched or unbranched $C_4$-$C_{20}$ α-olefin or a mixture thereof and wherein the polyolefin wax has a melt viscosity, as measured at 170° C., of not more than 30,000 mPa·s.

5. The method as claimed in claim 1, wherein the polyolefin wax and its recyclate have a dropping or softening point (ring/ball) between 70° C. and 165° C. and the recyclate has a melt viscosity measured at 170° C. of not more than 30,000 mPa·s.

6. The method as claimed in claim 1, wherein the polyolefin wax and its recyclate have a weight-average molar mass $M_w$ between 1000 and 40,000 g/mol and a number-average molar mass $M_n$ between 500 and 25,000 g/mol and an $M_w/M_n<5$.

7. The method as claimed in claim 1, wherein the component materials used in combination with one another in tufteds, wovens and nonwovens respond to admixing with a swellant by at least one component undergoing swelling and forming a polymer gel as a first phase which contains not more than 80 wt % of swellant, a second phase is formed concurrently or after a temperature- or pressure-induced separation and comprises at least one other component material in a dissolved state, and optionally an insoluble contrary present neither in the first phase nor in the second phase is removed from the polymer gel by filtration or sedimentation.

8. The method as claimed in claim 1, wherein component materials still containing solvent after having been separated off are desolventized and isolated by drying at temperatures in the range from 30 to 120° C., optionally in the presence of negative pressure.

9. The method as claimed in claim 1, wherein the component materials used combined with one another in tufteds, wovens and nonwovens comprise one or more, polymers that are soluble in a certain organic solvent and not more than one insoluble component material.

10. The method as claimed in claim 1, wherein the material for the filaments comprises natural fibers, wool, or manufactured fibers of LLDPE, LDPE, PP, polyester or polyamide and the material for the backing comprises polyethylene or polypropylene.

11. The method as claimed in claim 1, wherein the material for the bonding comprises a polyolefin wax used as hot-melt adhesive and composed of amorphous poly-alpha-olefins (APAO), metallocene-based homo- and copolymers or a combination thereof.

12. The method as claimed in claim 1, wherein the component materials optionally contain filler materials, wherein the filler material is calcium carbonate or auxiliary materials selected from the group consisting of flame retardants, antistats, waxes, resins, plasticizers, pigments and antioxidants.

13. The method as claimed in claim 1, wherein the recovered, varietally pure component materials are reused in their respective previous function in tufteds, wovens and nonwovens.

14. The method as claimed in claim 1, wherein the recovered, varietally pure component materials differ by not more than 20% in their tensile strength, their modulus of elasticity and their elongation at break, from the component materials in the original state.

15. The method as claimed in claim 4, wherein the polyolefin was has a melt viscosity, as measured at 170° C. of not more than 20,000 mPa·s.

16. The method as claimed in claim 5, wherein the recyclate has a melt viscosity measured at 170° C. of not more than 20,000 mPa·s.

17. The method as claimed in claim 6, wherein the polyolefin wax and its recyclate have an $M_w/M_n<2.5$.

18. The method as claimed in claim 6, wherein the polyolefin wax and its recyclate have an $M_w/M_n<1.8$.

19. The method as claimed in claim 1, wherein the component materials used combined with one another in tufteds, wovens and nonwovens comprise two or more polymers that are soluble in a certain organic solvent and not more than one insoluble component material.

20. The method as claimed in claim 1, wherein the recovered, varietally pure component materials are reused in their respective previous function in synthetic turf.

\* \* \* \* \*